(12) United States Patent
Sinivaara

(10) Patent No.: US 7,599,665 B2
(45) Date of Patent: Oct. 6, 2009

(54) SELECTION OF RADIO RESOURCES IN A WIRELESS COMMUNICATION DEVICE

(75) Inventor: Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 294 days.

(21) Appl. No.: 10/583,470

(22) PCT Filed: Dec. 19, 2003

(86) PCT No.: PCT/FI03/00975

§ 371 (c)(1),
(2), (4) Date: Jun. 19, 2006

(87) PCT Pub. No.: WO2005/060127

PCT Pub. Date: Jun. 30, 2005

(65) Prior Publication Data

US 2007/0115816 A1 May 24, 2007

(51) Int. Cl.
*H04B 17/80* (2006.01)
*H04W 4/00* (2006.01)
*H04W 36/00* (2006.01)

(52) U.S. Cl. ................. 455/67.16; 455/419; 455/422.1; 455/436; 455/452.2; 375/141; 375/295; 370/310; 370/328; 370/352; 370/389; 370/398; 709/203; 709/224; 709/227; 709/236

(58) Field of Classification Search ............. 455/422.1, 455/426.1, 435.1, 450, 522, 550.1, 67.16, 455/419, 436, 452.2; 370/230, 328, 330, 370/331, 395.21, 419, 466, 310, 514, 352, 370/389, 398, 410, 456; 709/227, 219; 375/141, 375/295; 713/324; 703/203, 224, 236

See application file for complete search history.

(56) References Cited

U.S. PATENT DOCUMENTS

| 5,805,983 A * | 9/1998 | Naidu et al. ............. 455/67.16 |
| 5,805,995 A * | 9/1998 | Jiang et al. .................. 455/436 |
| 6,041,228 A * | 3/2000 | Niska et al. ................. 455/419 |
| 6,597,698 B1 * | 7/2003 | Lundback et al. ........... 370/398 |

(Continued)

FOREIGN PATENT DOCUMENTS

| WO | WO 01/69961 | 9/2001 |
| WO | WO 03/103235 | 12/2003 |

*Primary Examiner*—William D Cumming
(74) *Attorney, Agent, or Firm*—Squire, Sanders & Dempsey L.L.P.

(57) ABSTRACT

The invention relates to a method for selecting radio resources for a communication session in a wireless communication terminal. In order to facilitate the selection of quality of service between diversified terminals, terminal capabilities are described by a set of capability parameters, the set including at least one parameter indicative of the terminal's capabilities. Based on the set of capability parameters, a dedicated quality class set is defined for an application instance residing in the terminal, the quality class set including at least one quality class for the application instance. When a session is to be established between at least two application instances residing respectively in at least two terminals, at least one quality class is negotiated for the session, the at least one quality class being determined based on the dedicated quality class sets of the at least two application instances. Based on the negotiation, radio resources are then allocated for the session.

21 Claims, 4 Drawing Sheets

U.S. PATENT DOCUMENTS

| | | | |
|---|---|---|---|
| 6,643,333 B1* | 11/2003 | Jung et al. | 375/295 |
| 6,658,578 B1* | 12/2003 | Laurenti et al. | 713/324 |
| 6,693,892 B1 | 2/2004 | Rinne et al. | |
| 6,725,039 B1* | 4/2004 | Parmar et al. | 455/436 |
| 6,728,270 B1* | 4/2004 | Meggers et al. | 370/514 |
| 6,904,058 B2* | 6/2005 | He et al. | 370/477 |
| 6,909,703 B2* | 6/2005 | Terry et al. | 370/328 |
| 6,990,087 B2* | 1/2006 | Rao et al. | 370/330 |
| 7,245,636 B1* | 7/2007 | Hans et al. | 370/474 |
| 7,352,698 B2* | 4/2008 | Niwano et al. | 370/230 |
| 2002/0071480 A1* | 6/2002 | Marjelund et al. | 375/141 |
| 2003/0210680 A1* | 11/2003 | Rao et al. | 370/352 |
| 2004/0057456 A1* | 3/2004 | He et al. | 370/465 |
| 2004/0111517 A1* | 6/2004 | Aggarwal et al. | 709/227 |
| 2004/0156332 A1* | 8/2004 | Terry et al. | 370/328 |
| 2004/0166841 A1* | 8/2004 | Parmar et al. | 455/422.1 |
| 2004/0259561 A1* | 12/2004 | Stewart et al. | 455/452.2 |
| 2005/0071459 A1* | 3/2005 | Costa-Requena et al. | 709/224 |
| 2005/0117601 A1* | 6/2005 | Anderson et al. | 370/465 |
| 2005/0120079 A1* | 6/2005 | Anderson et al. | 709/203 |
| 2005/0125840 A1* | 6/2005 | Anderson et al. | 725/118 |
| 2005/0135390 A1* | 6/2005 | Anderson et al. | 370/401 |
| 2005/0144225 A1* | 6/2005 | Anderson et al. | 709/203 |
| 2005/0157666 A1* | 7/2005 | Terry et al. | 370/310 |
| 2005/0163116 A1* | 7/2005 | Anderson et al. | 370/389 |
| 2005/0204057 A1* | 9/2005 | Anderson et al. | 709/236 |
| 2005/0213593 A1* | 9/2005 | Anderson et al. | 370/419 |
| 2005/0216599 A1* | 9/2005 | Anderson et al. | 709/232 |
| 2005/0259661 A1* | 11/2005 | Ishii et al. | 370/395.4 |
| 2005/0259670 A1* | 11/2005 | Anderson et al. | 370/401 |
| 2005/0271072 A1* | 12/2005 | Anderson et al. | 370/419 |
| 2005/0276417 A1* | 12/2005 | Funnell | 380/270 |
| 2006/0019655 A1* | 1/2006 | Peacock | 455/426.1 |
| 2006/0034301 A1* | 2/2006 | Anderson et al. | 370/401 |
| 2006/0034326 A1* | 2/2006 | Anderson et al. | 370/466 |
| 2006/0035644 A1* | 2/2006 | Niwano et al. | 455/450 |
| 2006/0035661 A1* | 2/2006 | Niwano et al. | 455/522 |
| 2006/0083191 A1* | 4/2006 | Niwano et al. | 370/328 |
| 2006/0083199 A1* | 4/2006 | Yang | 370/331 |
| 2006/0248201 A1* | 11/2006 | Eckert et al. | 709/227 |
| 2007/0015500 A1* | 1/2007 | Parmar et al. | 455/422.1 |
| 2007/0115816 A1* | 5/2007 | Sinivaara | 370/230 |
| 2007/0118659 A1* | 5/2007 | Cuny et al. | 709/227 |
| 2007/0183411 A1* | 8/2007 | Song et al. | 370/352 |
| 2007/0259683 A1* | 11/2007 | Hartikainen et al. | 455/550.1 |
| 2007/0293215 A1* | 12/2007 | Dawson | 455/433 |
| 2007/0293239 A1* | 12/2007 | Dawson et al. | 455/456.1 |
| 2007/0298793 A1* | 12/2007 | Dawson | 455/435.1 |
| 2008/0008116 A1* | 1/2008 | Buga et al. | 370/328 |
| 2008/0008188 A1* | 1/2008 | Buga et al. | 370/395.21 |
| 2008/0020757 A1* | 1/2008 | Hans et al. | 455/432.2 |
| 2008/0040452 A1* | 2/2008 | Rao et al. | 709/219 |
| 2008/0043648 A1* | 2/2008 | Buga et al. | 370/310 |
| 2008/0069046 A1* | 3/2008 | Ishii et al. | 370/330 |

* cited by examiner

SELECTION OF RADIO RESOURCES IN A WIRELESS COMMUNICATION DEVICE

FIELD OF THE INVENTION

The invention relates to selection of radio resources for a communication session in a wireless communication device.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of a few tens of meters to one hundred meters. They often combine with systems wired to the Internet and/or with a mobile network to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks are cost-effective and use low power wireless devices that have a typical range of about ten meters. The best-known example of wireless personal area network technology is BLUETOOTH™, which uses the 2.4 GHz ISM band. It provides a peak air link speed of one Mbps, and power consumption low enough for use in personal, portable electronics such as PDAs and mobile phones. Wireless local area networks generally operate at higher peak speeds of about 2 to 100 Mbps and have a longer range, which requires greater power consumption.

The development referred to above has also brought on the evolvement of so-called ad-hoc networks, which offer unrestricted mobility without any underlying infrastructure. The nodes of an ad-hoc network are often mobile, in which case the network is called a mobile ad-hoc network (MANET). Unlike traditional wireless networks, ad-hoc networks need not necessarily rest on an underlying infrastructure, such as base stations. Instead, the nodes rely on each other to keep the network connected. In an ad-hoc network, one or more nodes may therefore act as a router transmitting data/messages to other nodes of the network, and intermediate ad-hoc nodes may relay the data/messages between two nodes located far apart from each. Standalone ad-hoc networks are useful at least whenever it is impossible to use a fixed network infrastructure due to geographical, terrestrial, or time constraints, for example. Local ad-hoc networks can also be integrated into legacy networks, such as mobile networks. The dynamically changing topology of an ad-hoc network sets high requirements for the routing protocols used in the ad-hoc nodes. This is one reason why activities in the development of the ad-hoc networks have for the present related mainly to routing aspects.

Along with the above-discussed development, the number of radio technologies utilized in the terminals, and also the number of multimode (and multi-standard) wireless terminals will increase. With an increasing number of technologies used for networking, the diversity of the terminals will increase within future networks. For example, the trunk node of an ad-hoc network, which acts as an access point or gateway for other ad-hoc nodes in the ad-hoc network, communicates with an access point of a radio access network and with at least one other ad-hoc node being its subordinate node.

As even terminals provided with the same connectivity standards may be otherwise differently outfitted, and thus have different capabilities despite the same connectivity standard, selecting an optimal quality of service and optimal radio resources for communication sessions will be more complex in the future.

Another drawback of the above-discussed development relates to the user-friendliness of the communication devices. When multiple radio technologies are integrated into one terminal, operating the different radio technologies becomes easily too technical for an average user. Especially, choosing the optimal radio technology in a communication environment comprising a plurality of different multimode terminals will be difficult. Therefore, new mechanisms are needed by which the technologies can be hidden from the user while simultaneously enabling efficient operation and easy operability of the terminal.

The present invention seeks to accomplish a solution by means of which the above drawbacks may be alleviated or eliminated.

SUMMARY OF THE INVENTION

The present invention seeks to devise a new mechanism for selecting the quality of service and the corresponding radio resources in a wireless communication device. The present invention further seeks to improve the user-friendliness of the device, while simultaneously ensuring efficient use of radio resources in a wireless communication environment. The selection of "radio resources" refers generally to the selections related to the radio technology, which need to be made to meet the selected quality of service. The selection of the radio resources may thus simply involve the selection of a connectivity standard for the session. However, as one radio technology may include several radio links, the selection may also involve the selection of the link(s). The selection of the radio resources may also include selection of the associated transmission and/or reception resources. This applies especially to terminals provided with only one short-range radio link. In case of single link terminals, the selection of the radio resources may thus involve the selection of the associated resources only, i.e. transmission and/or reception parameters, such as the modulation rate, the coding, the transmission power, or the reception thresholds.

The invention provides an application-level quality of service (QoS) selection, which may be automatic or semi-automatic. In the present invention, the capabilities of the device are described by a set of capability parameters indicative of the capabilities of the device itself. An application instance installed or being installed in the device utilizes the parameters to define a quality class set for itself. When a communication session is to be established between two application instances residing respectively in two different terminals, the quality class sets of the two application instances are utilized to define at least one common quality class for a communication session between the instances. A common quality class thus refers to a quality level that all the participating instances can use when communicating with another terminal. The at least one common quality class may be selected automatically without user interaction or the preferences of the user may be taken into account, either directly by accessing a user profile stored in the terminal or by prompting the user to indicate his or her preferences. The radio resources to be allocated for the session are then selected in the terminals.

The radio resources may be negotiated in connection with the negotiation of the at least one common quality class or the radio resources may be selected based on the at least one common quality class after the negotiation in each terminal.

Thus one embodiment of the invention is the provision of a method for selecting radio resources for a communication session in a wireless multimode communication device. The method includes the steps of describing device capabilities by a set of capability parameters, the set including at least one parameter indicative of the device's capabilities, and defining, based on the set of capability parameters, a dedicated quality class set for an instance of an application, the quality class set including at least one quality class for the instance, where the describing and defining steps are performed for at least two instances of the application, the at least two instances of the application residing respectively in at least two wireless communication devices. The method further includes the steps of negotiating at least one common quality class for a communication session between the at least two instances of the application, the at least one common quality class being determined based on the dedicated quality class sets of the at least two instances of the application, wherein the negotiating step is performed between at least two of the at least two wireless communication devices and allocating, based on the negotiating step, radio resources for the communication session, the allocating step being performed in the at least two wireless communication devices.

In another embodiment, the invention provides a wireless communication device. The device includes at least one short-range radio interface and a memory unit storing a set of capability parameters, the set including at least one parameter indicative of the device's capabilities. The device also includes an interface through which the set of capability parameters is readable from the memory unit for defining, based on the set of capability parameters, a quality class set for an application instance, the quality class set including at least one quality class. The device further includes negotiation means for selecting at least one common quality class for a communication session to be established between the application instance and at least one external application instance having respectively at least one external quality class set, the negotiation means being configured to select the at least one common quality class based on the quality class set and the at least one external quality class set and allocating means, responsive to the negotiation means, for allocating radio resources for the communication session.

In one embodiment of the invention, the allocation means are further configured to select the radio resources based on the at least one common quality class selected.

In a still further embodiment, the invention provides a computer program product for a wireless communication device. The computer program product is stored on a computer readable storage media and configured, when being installed into the wireless communication device, to read a set of capability parameters from a wireless communication device, the set including at least one parameter indicative of the device's capabilities, and to define, based on the set of capability parameters, a dedicated quality class set including at least one quality class.

BRIEF DESCRIPTION OF THE DRAWINGS

In the following, the invention and many of its embodiments are described more closely with reference to the examples shown in FIG. 1 to 6 in the appended drawings, wherein.

DETAILED DESCRIPTION OF THE INVENTION

Figure 1:
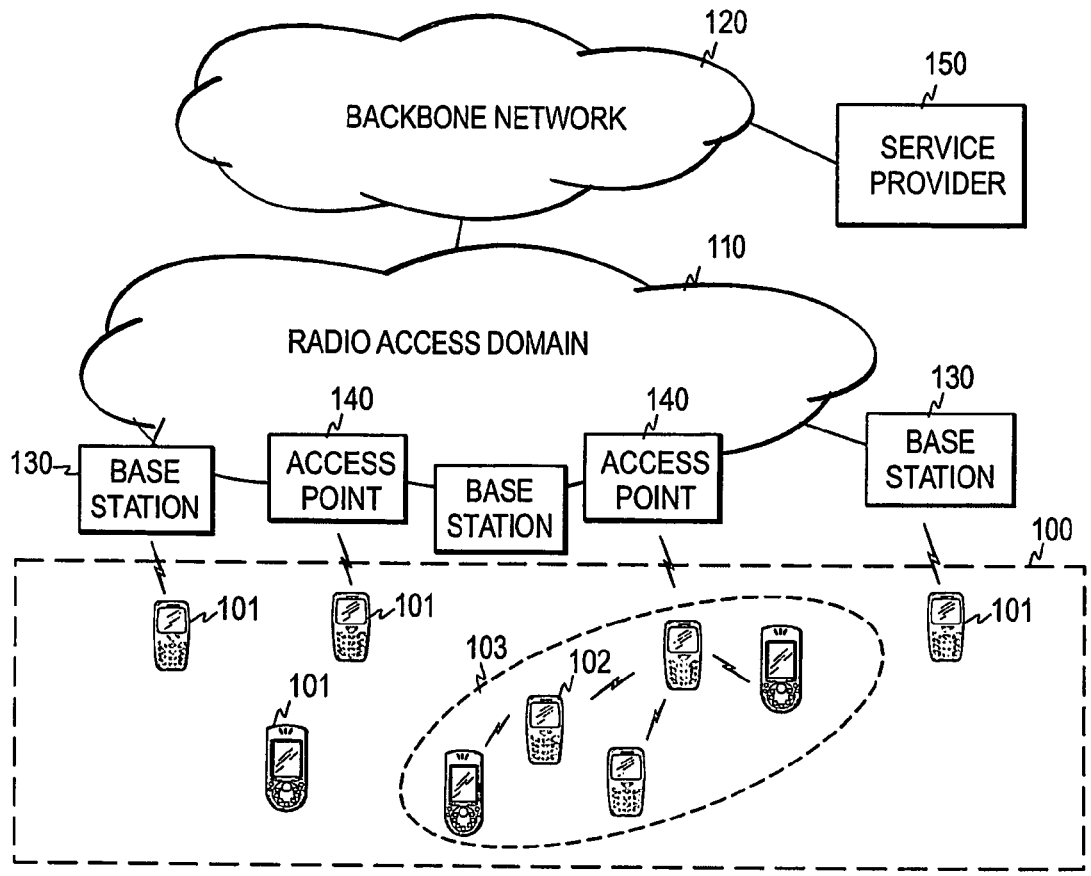
FIG. 1 illustrates an example of a communication environment in which a terminal of the invention may operate.

FIG. 1 shows an example of a general communication environment in which the present invention can be applied. The communication environment comprises three interacting domains: a user equipment domain 100, an access domain 110 comprising several radio access networks, and a backbone domain 120 comprising a core network.

The above communication environment typically includes a mobile network and one or more short-range wireless networks. The mobile network may be based on the UMTS (Universal Mobile Telecommunication System) or on the GSM (Global System of Mobile communications) network architecture, for example. The short-range wireless network(s) may in turn be based on various technologies, such as Wireless Local Area Network (WLAN), BLUETOOTH or Ultra Wide Band (UWB) technology. The access domain may thus include base stations 130 (or node B elements) of the mobile network and access points 140 of the short-range wireless systems. The backbone domain includes a plurality of service providers 150.

The User Equipment domain includes a plurality of mobile terminals 101. In this context, it is assumed that the terminals are mostly multimode terminals. A multimode terminal here refers to a terminal that has at least two operation modes, i.e. at least two radio interfaces based on different connectivity standards. Although one operation mode may be provided for communicating with the mobile network, the terminal is also provided with one or more other operation modes, in which a short-range radio of the terminal may be active. The terminals typically have different states with respect to each operation mode, and the states allowed concurrently depend on the implementation of the terminal.

The mobile terminals may also form ad-hoc networks 103 in which the terminals may communicate directly with each other. The ad-hoc networks may be connected to a radio access network through one or more access points of the access domain. Each ad-hoc network then comprises at least one trunk node 102, which communicates with an access point of the radio access network, and at least one other ad-hoc node for which the trunk node acts as an access point or gateway. The said other nodes may be located at different distances from the trunk node, measured as the number of hops between the node and the trunk node, i.e. the trunk node does not have to have a direct connection to each of said other nodes, but the messages between the trunk node and an ad-hoc node being further than one hop apart from the trunk node are relayed by intermediate ad-hoc nodes.

Although the terminals may rest on network infrastructure in the above-described manner, the communication environment in which the invention can be applied may also be much simpler. For example, two or more terminals may form a simple ad-hoc network that does not have a connection to any network infrastructure and in which no sophisticated routing algorithms are used.

In the present invention, a terminal is provided with capability parameters describing the capabilities of the terminal, i.e. the performance of the terminal. As different radio technologies have different performances, the capability parameters depend on the outfitting of the terminal. The capability parameters may also describe several other factors indicative of the terminal's performance, such as the memory and processing capacities and the display type of the terminal.

An application instance installed or being installed in the terminal utilizes the capability parameters to define a set of quality classes for itself. Each application of a terminal may thus define a different set of quality classes, depending on the type of the application, i.e. on the performance requirements of the application. Furthermore, different instances of the same application may define different sets in two different terminals, since the terminals may be differently outfitted. One quality class indicates a quality requirement with respect to at least one quality factor, such as data rate, latency, latency variation, packet interval, etc, each quality class of an application instance being thus adapted to the capabilities of the terminal. Packet interval requirements may be used, for example, to indicate the level of power consumption; longer packet intervals allow the terminals more time for a power save mode. The quality class may also indicate the corresponding radio technology, i.e. there may be several quality classes for the same quality factor value(s), each indicating a certain radio technology.

When a communication session is to be established, at least one quality class is negotiated for the session based on the quality class sets of the participating application instances and the radio resources are selected for the session based on the negotiation. It is thus assumed here that the application requires a connection to be established with at least one other terminal or network element storing an instance of the same application. Such an application may be a game or an application in which data streams, such as video streams are transferred, for example.

Figure 2:
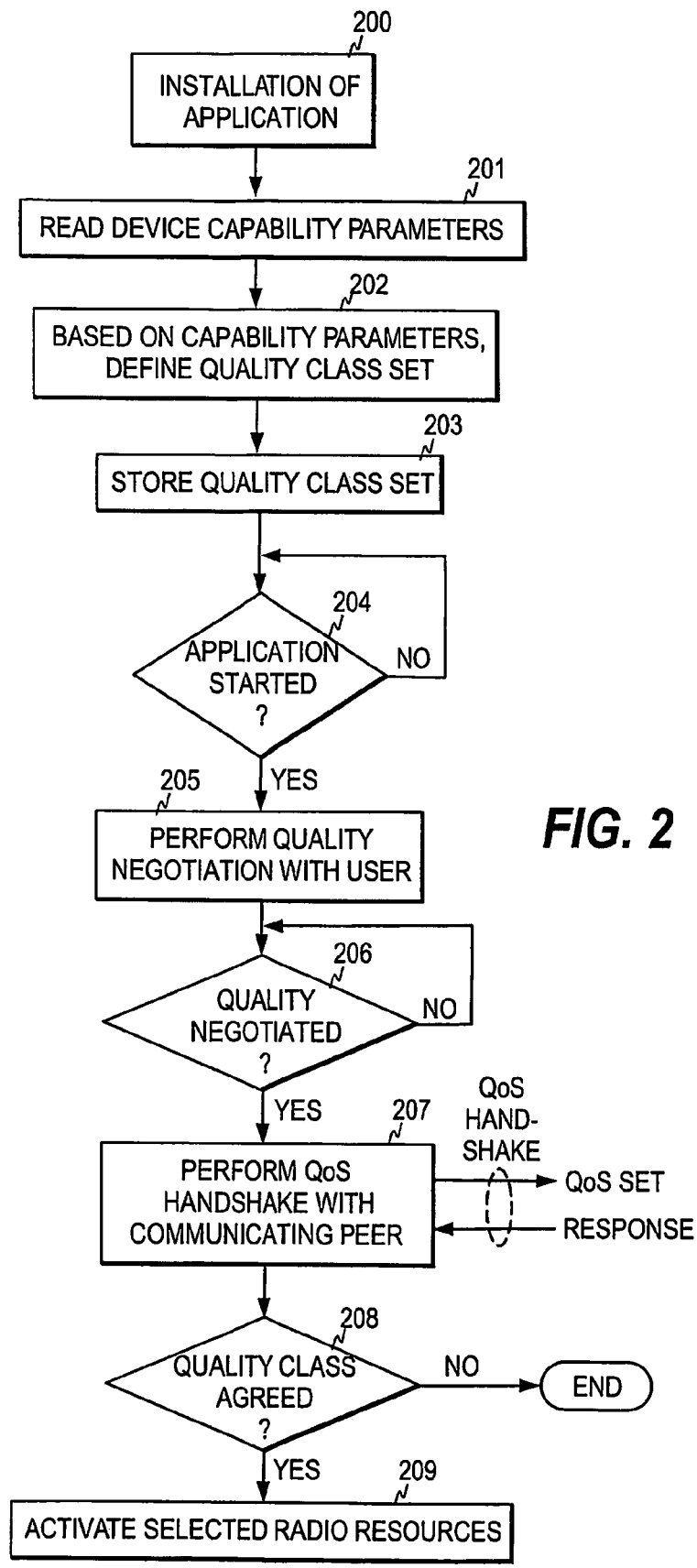
FIG. 2 is a flow chart illustrating the operation of a terminal in one embodiment of the invention.

FIG. 2 illustrates one embodiment of the operation of a terminal for selecting at least one quality class and radio resources for a session to be established with another multi-mode terminal with a similar application. As mentioned above, the terminal is provided with a set of capability parameters describing the capabilities of the terminal, i.e. the performance of the terminal. When the application is installed into the terminal (step 200), the installed application instance reads these terminal-specific parameters (step 201) and defines a set of quality classes for itself based on the parameters (step 202). The set includes one or more quality classes available for the application instance when communicating with another instance of the same application. The number of the quality classes in a set depends, for example, on the requirements of the application, on the capabilities of the terminal (i.e. on the types of the available radio technologies), and also on whether one quality class indicates a quality requirement with respect to one or more quality factors. The set is stored in the terminal for the use of the application (step 203).

When the user of the terminal starts the application (step 204), the terminal may perform a quality negotiation with the user (step 205). In this step, the quality class set is presented to the user and the user is queried to select a quality class. However, as discussed below, the quality class set is not necessarily presented to the user as such, but the terminal may map the quality classes of the set to "quality modes" which may be presented in a simplified language to the user. When the user selects one of the quality modes, the terminal maps the selected quality mode to a set of quality classes (step 206), which is here termed a QoS set, since it is normally not the same set as the quality class set of the application instance, but rather a subset of the quality class set since the choice of the user typically limits the number of possible classes. The terminal then performs a QoS handshake with a communicating terminal (step 207) to agree on at least one quality class common to the terminals to be used for the session and possibly also on the radio resources to be utilized (step 208). If the quality classes do not indicate the corresponding radio technology, the terminals may also agree on the radio technology in the handshake. Otherwise the terminals may select the radio resources based on the agreed quality class(es) after the handshake.

In one embodiment of the invention, a "minimum" radio technology is selected by means of which the agreed quality class is obtainable. The minimum radio technology here refers to the technology whose highest possible quality class is closest to the agreed quality class. When the selection has been made, the terminal activates the selected radio resources and the session may start (step 209). If a quality class indicates a quality requirement with respect to one quality factor only, the terminals typically agree on several common quality classes to be used for the session. However, if one quality class indicates a quality requirement with respect to several quality factors, the terminals may also agree on a single common quality class for the session.

The selection of the radio resources may simply involve selection of the radio link to be used, or the selection may also involve selection of the associated resources, i.e. various transmission and/or reception parameters. Although the method of the invention is mainly intended for terminals with multiple radio technologies, it may also be used even if the terminals are provided with only one short-range radio link. Especially in this case the selection of the radio resources involves selection of the transmission and/or reception parameters.

In the above embodiment, the selection process was semi-automatic in the sense that a quality negotiation was performed with the user. However, the selection process may also be totally automatic. In one embodiment of the invention, an automatic selection process may be implemented so that the terminals agree on the said at least one common quality class using certain predetermined criteria, such as always selecting the highest quality class(es) common to all instance-specific sets participating in the session. In another embodiment of the invention, an automatic selection process may be implemented by storing user preference data in the terminal and taking the data into account in the selection process. For example, the user may give the terminal instructions to agree on the quality class that allows the lowest possible battery consumption.

Figure 3:
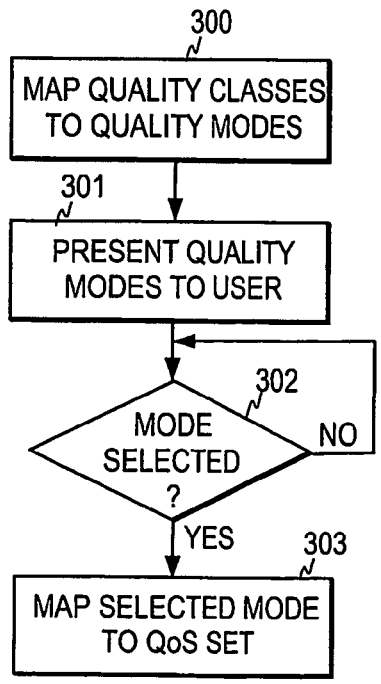
FIG. 3 is a flow chart illustrating one embodiment of the user interaction process shown in FIG. 2.

FIG. 3 illustrates an example of the quality negotiation performed with the user. As mentioned above, the quality class set of the application is not necessarily presented to the user as such, but the terminal may map the classes to "quality modes" to improve the user-friendliness of the process. For example, the terminal may display quality modes such as "low performance and low battery consumption", "medium performance and medium battery consumption", and "high performance and high battery consumption" to the user and ask the user to select one of these modes. The terminal may thus map the quality classes of the application instance to quality modes of the above kind (step 300) and present the quality modes to the user (step 301). When the user selects a mode (step 302), the terminal maps the selected mode back to a QoS set (step 303). The QoS set is typically a subset of the quality class set, the subset being defined by the selection of the user. The QoS set, which indicates one or more quality classes, is sent to the opposite terminal during the handshake (cf. step 207).

It is also possible to conduct another negotiation through the user interface for obtaining the user's approval for the selected radio technology prior to the activation of the radio. Alternatively, the user may just be informed of the radio technology selected for the session.

Figure 4:
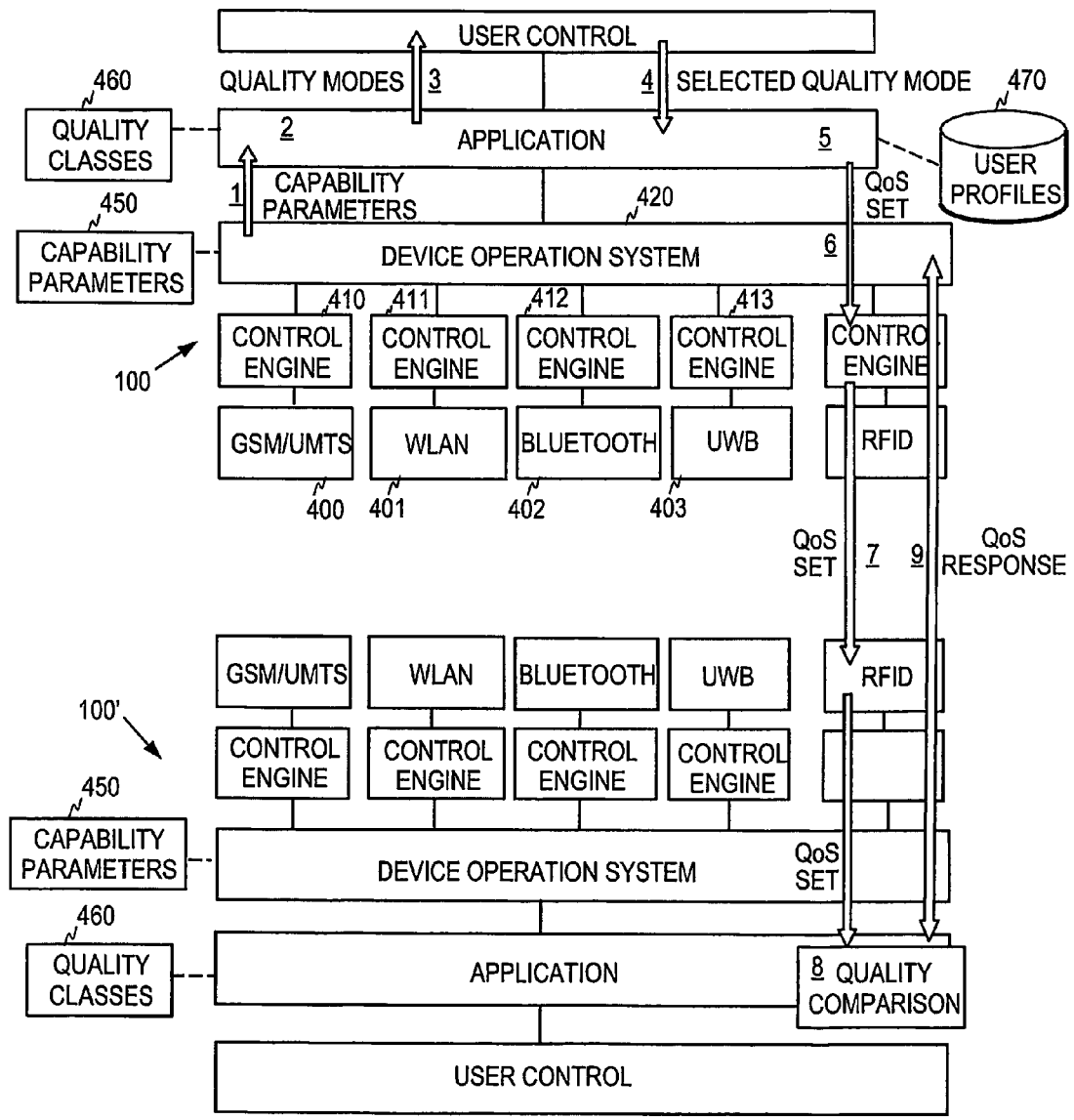
FIG. 4 illustrates the architecture of one embodiment of a multimode terminal of the invention.

FIG. 4 illustrates the architecture of a multimode terminal 100 according to one embodiment of the invention. It is assumed here that the terminal comprises an interface 400 to a mobile network, such as a GSM or an UMTS network, and a plurality of short-range radio interfaces, such as a WLAN interface 401, a BLUETOOTH interface 402, and a UWB interface 403. It is further assumed here that the terminal comprises a radio frequency identification (RFID) interface, which is used for the above-described QoS handshake in proximity communication. The RFID interface may form a RFID tag reader, which may also be capable of acting as a RFID tag.

Each radio interface is controlled by a corresponding control engine 410 to 413 that provides, for example, the Medium Access Control (MAC) services in the corresponding operation mode. An operation system layer 420 controls the different control engines and the states of the terminal. The operation system layer receives the selections made by the user in an application and controls the state and operation of the terminal accordingly. The operation system layer stores the capability parameters 450 of the terminal, and the application instance reads the capability parameters from the operation system layer in connection with its installation into the terminal. The operation system layer thus provides an interface through which the application instances may read the capability parameters. The instance-specific quality classes may be stored in the application layer. The application layer may also have access to user preference data stored in a profile database 470.

The arrows and the underlined step numbers illustrate the above-described steps for agreeing on one or more quality classes with another terminal and for selecting radio resources corresponding to the quality class(es) agreed upon. When installed, the application instance reads (step 1) the capability parameters from the operation system layer and defines (step 2) a set of quality classes 460. When the user of a first terminal 100 starts the application, the application presents (step 3) the quality classes, or the quality modes corresponding to the quality classes, to the user. Based on the selection made by the user (step 4), the application may then define (step 5) the QoS set, which is then supplied to the RFID interface (step 6). As mentioned above, the user interaction may also be omitted and the QoS set may be defined automatically based on the user preference data stored in the profile database.

The QoS set is transferred through the RFID interface (step 7) to the opposite terminal 100' where it is transferred through the opposite RFID interface to the application layer to be compared (step 8) with the quality class set of the application instance in terminal 100'. In response to the comparison, the opposite terminal returns a response to the first terminal. The messages transferred between the two terminals form a QoS handshake by means of which the terminals agree on at least one quality class and possibly also on the radio resources to be used for the connection (step 9). As discussed above, the handshake may be utilized to select the radio resources or the selection of the radio resources may be made after the handshake in each terminal. The radio interface corresponding to the selected radio resources is then activated through the device operation system layer and one of the control engines.

The opposite terminal may also return its QoS set to the first terminal without performing the comparison. The first terminal then selects the quality class and informs the opposite terminal of the selected quality class, if necessary. The above selection process may also be performed by entities below the application layer, i.e. it is not necessary to transfer the QoS data up to the application layer. The entity handling the selection process first obtains the QoS set from the opposite terminal and agrees on the quality class(es) and possibly also on the radio resources with a communicating terminal. The entity then gives a triggering signal to one of the control engines for activating the selected radio interface. The said entity also handles the selection of the transmission and/or the reception parameters, if such selections are to be made in order to meet the quality level agreed upon.

During the handshake, the terminals may operate in active RFID communication mode, for example, in which one terminal actively simulates a RFID tag reader and the other terminal actively simulates a RFID tag. The terminal may, for example, be in a RFID tag mode (transponder) by default but assume a RFID reader mode (interrogator) when the application is started. The reading of the tag (i.e. the QoS set) may then activate the application in the terminal acting as a RFID tag.

The QoS handshake may include two or more messages between the terminals, depending on how well the QoS set received matches the quality class set of the application instance in the opposite terminal. The opposite terminal may thus directly accept the QoS set received and the corresponding radio resources, or it may suggest another radio technology for the session, if its capabilities are insufficient for the QoS set received. As indicated above, the messages transferred between the terminals may include information about the radio resources available or selected currently, or the selected quality class(es) may unambiguously indicate the corresponding radio resources, whereby it is not necessary to identify the radio resources in the messages. Moreover, the quality classes of the QoS set may be indicated in different ways in the messages, i.e. various identifiers identifying the quality classes available and/or the corresponding radio resources may be exchanged between the terminals.

The QoS handshake may also be performed through another short-range radio interface than the RFID interface, such as the BLUETOOTH interface. It is also possible that the QoS set is first read through the RFID interface and then the subsequent negotiation is performed through another interface.

The entities handling the selection process may also receive other input information that affects the quality class(es) and the radio resources to be selected. For example, the said entity may be informed through the device operation system layer that one or more terminals wish to join the session. A change in the number of the participants in a session may be one factor that causes a change in the radio technology used for the session.

The common quality class(es) may be renegotiated, if the conditions change during the session. One or more of the participating terminals may monitor, if a predetermined event occurs during the session, and initiate a renegotiation procedure when the event is detected. This event may be a renegotiation request from one of the participating terminals, for example. The terminals may monitor the quality of service and request a renegotiation, if the quality of service is not satisfactory. A user may also wish to change the current quality level in the middle of the session, in which case the corresponding terminal may send a renegotiation request. The predetermined event may also be the reception of a request from an external terminal, whose quality class set is incompatible with the common quality class(es), to join the on-going session. The term incompatible here refers to a quality class set including only quality classes by means of which the quality level corresponding to the prevailing common quality class(es) cannot be met or quality classes that require another radio technology before the quality level corresponding to the prevailing common quality class(es) can be met.

Figure 5:
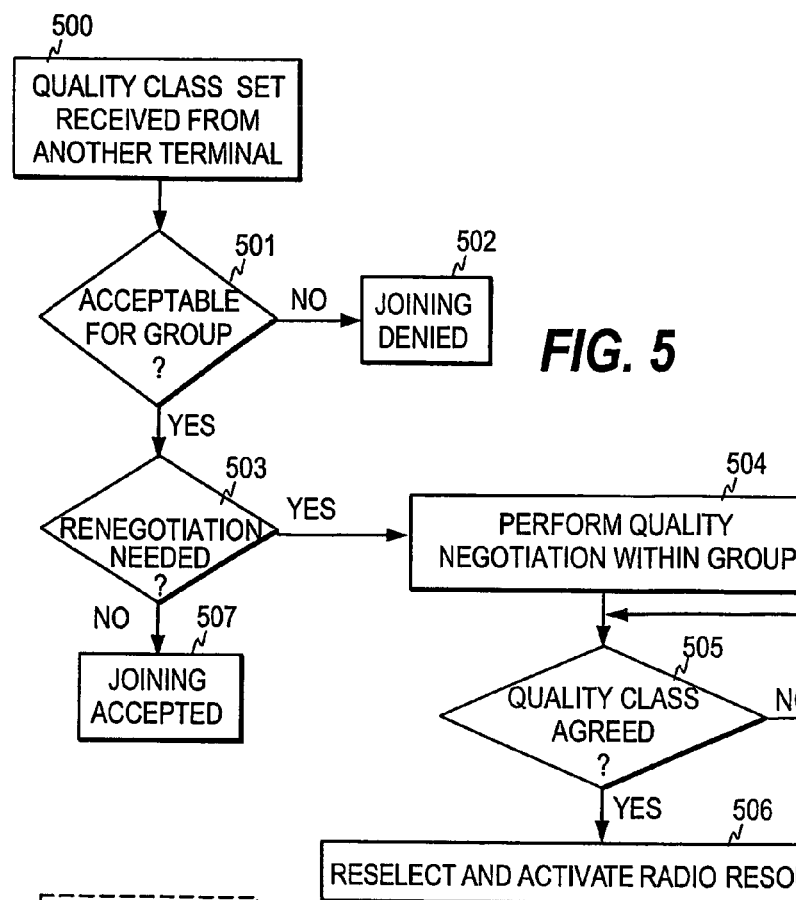
FIG. 5 is a flow chart illustrating the operation of a terminal in one embodiment of the invention.

FIG. 5 illustrates an example of the operation of a terminal when receiving a QoS set from an external terminal wishing to join an on-going session between a group of two or more terminals. The wish may be detected as an external terminal reads the quality class set through the RFID interface, for example. When the QoS set is received from an external terminal (step 500), the terminal examines, whether the received QoS set is acceptable for the group (step 501), either as such or after reselection of the common quality class(es). If this is not so, joining is denied (step 502). If reselection is needed (step 503), a quality negotiation is performed within the group and at least one new quality class and radio resources are selected for the group now including a new terminal (steps 504 to 506). The reselection may result in a change in the radio technology used.

If the number of terminals forming an ad-hoc network is greater than two, the common quality class(es) may be negotiated in various ways. For example, each terminal may negotiate one or more common quality classes separately with each of the other terminals, in which case different quality classes may be used between different terminals. In another embodiment, one terminal may collect the QoS sets and decide on one or more common quality classes to be used within the network. The negotiation thus also includes such an operation in which one terminal collects the necessary information and one-sidedly decides on the common quality class(es) and on the corresponding radio resources.

Figure 6:
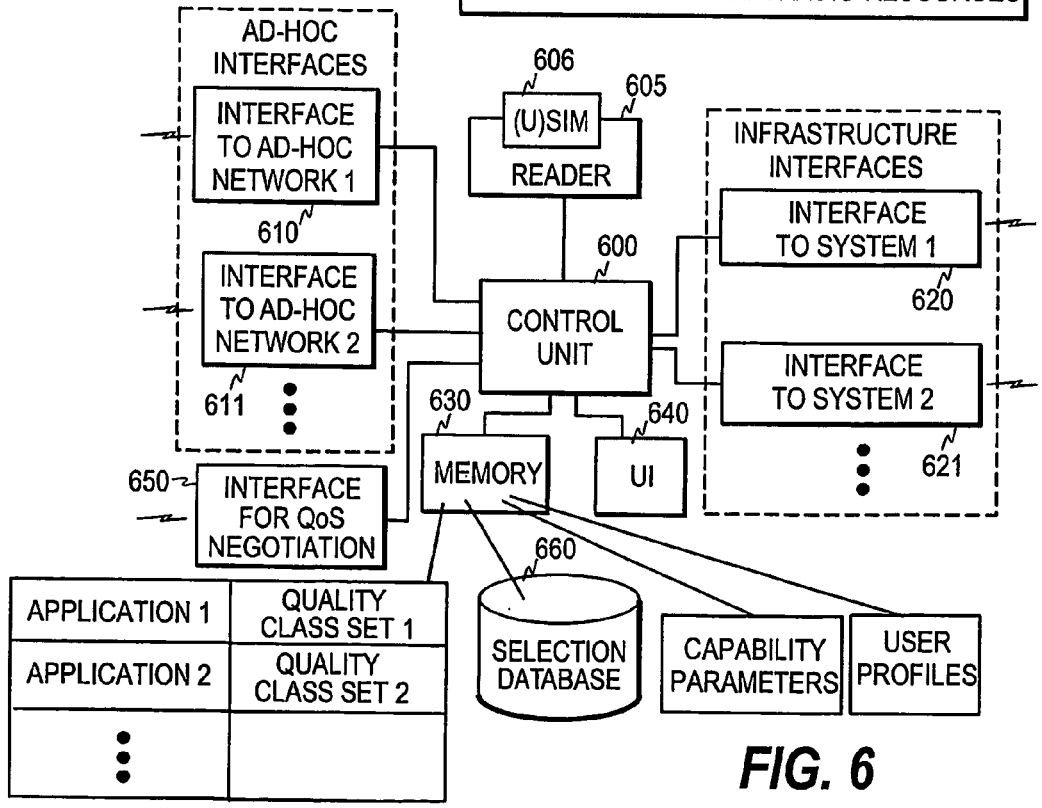
FIG. 6 is schematic presentation of one embodiment of a multimode terminal according to the invention.

FIG. 6 is a schematic presentation of one embodiment of an ad-hoc terminal according to the invention. The core of the terminal is a control unit 600, which is connected to various interfaces of the terminal. Generally, the interfaces of the terminal may be divided into two classes: interfaces for ad-hoc networks and interfaces for the network infrastructure. However, depending on the type of the ad-hoc terminal, it may be provided with ad-hoc interfaces only. The ad-hoc interfaces include one or more interfaces 610, 611, each offering the functionality needed to accomplish connectivity to an ad-hoc network of a particular type. As shown above, the terminal may further include one short-range radio interface 650, such as a RFID interface, which is used for the QoS selection process only. Several ad-hoc interfaces are necessary, at least whenever the terminal acts as a trunk node that serves ad-hoc networks based on different technologies. For example, one ad-hoc network served may be based on WLAN technology, while another one may be based on BLUETOOTH or UWB technology.

The interfaces to the supporting infrastructure also include one or more interfaces 620, 621, each offering the functionality needed to accomplish connectivity to a system (i.e. network infrastructure) of a particular type. For example, interface 620 may offer connectivity to a GSM or UMTS network, while interface 621 offers connectivity to a WLAN network.

The terminal normally also includes a card reader 605 into which an identity module, such as a (Universal Subscriber Module ((U)SIM), User Identity Module (UIM) or a (User) Integrated Circuit Card ((U)ICC) 606 can be inserted. The card reader and the memory unit are connected to the control unit in order that the control unit is able to read data from the identity module and from the memory unit and write data into the identity module and into the memory unit. In addition, the terminal includes user interface means 640 for using the terminal. The user interface means typically include a display and a keypad.

The memory unit 630 includes a memory area storing the above-described capability parameters. The application instances, also residing in the memory unit, read these capability parameters and generate a quality class set based on the parameters when executed for the first time by the control unit. As shown in the figure, the memory unit may thus store a dedicated quality class set for each application installed in the terminal, although two sets may be similar. The memory unit may also store the user preference data for the quality class selection. The memory unit may further include a selection database 660, which the control unit may utilize for selecting the radio resources based on the quality class(es) agreed. The database includes selection rules or other data that associate the quality classes with the radio resources. The rules may be in the form of one or more tables that map the quality classes to the radio resources or in the form of a more sophisticated selection logic. The selection database may further include rules that the control unit may use for selecting the common quality class(es) during the handshake.

Although the invention was described above with reference to the examples shown in the appended drawings, it is obvious that the invention is not limited to these, but may be modified by those skilled in the art without departing from the scope and spirit of the invention. For example, the implementation of the functionalities of the invention in a terminal may vary in many ways depending, for example, on the radio interface through which a QoS handshake is performed. Furthermore, the application instance does not necessarily have to be the entity that defines the quality class set, but the terminal may supply the set to the application instance after the instance has requested the set and supplied its requirements to the terminal.

The invention claimed is:

1. A method, comprising:

describing device capabilities by a set of capability parameters, the set including at least one parameter indicative of capabilities of a wireless communication device;

based on the set of capability parameters, defining a dedicated quality class set for an instance of an application, the dedicated quality class set including at least one quality class for the instance, wherein the describing and the defining are performed for at least two instances of the application, the at least two instances of the application residing respectively in at least two wireless communication devices;

negotiating at least one common quality class for a communication session between the at least two instances of the application, the at least one common quality class being determined based on the dedicated quality class sets of the at least two instances of the application, wherein the negotiating is performed between at least two of the at least two wireless communication devices; and allocating, based on the negotiating, radio resources for the communication session, the allocating being performed in the at least two wireless communication devices.

2. A method according to claim 1, wherein the negotiating further comprises transferring a quality of service set from a first wireless communication device to at least one second wireless communication device, wherein the quality of service set indicates at least one quality class of the dedicated quality class set of an instance of the application in the first wireless communication device and wherein the first and the at least one second communication device belong to the at least two wireless communication devices.

3. A method according to claim 2, wherein the transferring is performed via a radio frequency identification (RFID) interface of the first wireless communication device.

4. A method according to claim 2, further comprising:
mapping the dedicated quality class set to a group of quality modes;
querying a user of the first wireless communication device to select one of the quality modes; and
deducing the quality of service set from the quality mode selected by the user.

5. A method according to claim 1, wherein the defining is performed when the application is installed in the wireless communication device.

6. A method according to claim 1, further comprising:
detecting, in one of the at least two wireless communication devices, the presence of at least one other of the at least two wireless communication devices; and
initiating the negotiating in response to the detecting.

7. A method according to claim 1, wherein the allocating further comprises selecting the radio resources based on the at least one common quality class.

8. A method according to claim 1, wherein the negotiating further comprises negotiating the radio resources for the communication session.

9. A method according to claim 1, further comprising:
monitoring whether a predetermined indication is received by at least one of the at least two wireless communication devices, and
repeating the negotiating and the allocating when the predetermined indication is received.

10. A method according to claim 9, wherein the predetermined indication indicates that an external application instance with a quality class set incompatible with the at least one common quality class set wishes to join the communication session.

11. A method according to claim 9, wherein the predetermined indication indicates that one of the at least two instances of the application requires a change in the at least one common quality class.

12. An apparatus, comprising:
at least one short-range radio interface;
an interface configured to define, based on a set of capability parameters, a quality class set for an application instance, wherein the set of capability parameters includes at least one parameter indicative of capabilities of the apparatus and the quality class set includes at least one quality class;
a negotiation unit configured to select at least one common quality class for a communication session to be established between the application instance and at least one external application instance having respectively at least one external quality class set, the negotiation unit configured to select the at least one common quality class based on the quality class set and the at least one external quality class set; and
an allocating unit, responsive to the negotiation unit, configured to allocate radio resources for the communication session.

13. The apparatus according to claim 12, wherein an application to be installed in the apparatus is configured to read the set of capability parameters from a memory unit.

14. The apparatus according to claim 12, wherein the allocation unit is operably connected to the at least one short-range radio interface to activate a short-range radio interface corresponding to the radio resources allocated for the communication session.

15. The apparatus according to claim 12, wherein the negotiation unit is configured to
query a user of the apparatus to select a quality mode, the quality mode determining at least one of the at least one quality class, and
indicate the at least one of the at least one quality class to the at least one external application instance.

16. The apparatus according to claim 12, wherein the negotiation unit comprises a radio frequency identification (RFID) interface configured to indicate at least one of the at least one quality class to an external RFID device.

17. The apparatus according to claim 12, wherein the negotiation unit is further configured to negotiate the radio resources with at least one other apparatus containing, respectively, the at least one external application instance.

18. The apparatus according to claim 12, wherein the allocation unit is further configured to select the radio resources based on the at least one common quality class.

19. A computer program embodied on a computer readable medium, the computer program being configured to control a processor to perform:
reading a set of capability parameters from a wireless communication device, the set including at least one parameter indicative of capabilities of the wireless communication device; and
defining, based on the set of capability parameters, a dedicated quality class set including at least one quality class.

20. An apparatus, comprising:
at least one short-range radio interface;
interface means for defining, based on a set of capability parameters, a quality class set for an application instance, wherein the set of capability parameters includes at least one parameter indicative of capabilities of the apparatus and the quality class set includes at least one quality class;
negotiation means for selecting at least one common quality class for a communication session to be established between the application instance and at least one external application instance having respectively at least one external quality class set, and for selecting the at least one common quality class based on the quality class set and the at least one external quality class set; and
allocating means, responsive to the negotiation means, for allocating radio resources for the communication session.

21. A computer program embodied on a computer readable medium, the computer program being configured to control a processor to perform:
describing device capabilities by a set of capability parameters, the set including at least one parameter indicative of capabilities of a wireless communication device;
based on the set of capability parameters, defining a dedicated quality class set for an instance of an application, the dedicated quality class set including at least one quality class for the instance, wherein the describing and the defining are performed for at least two instances of the application, the at least two instances of the application residing respectively in at least two wireless communication devices;

negotiating at least one common quality class for a communication session between the at least two instances of the application, the at least one common quality class being determined based on the dedicated quality class sets of the at least two instances of the application, wherein the negotiating is performed between at least two of the at least two wireless communication devices; and allocating, based on the negotiating, radio resources for the communication session, the allocating being performed in the at least two wireless communication devices.

* * * * *